United States Patent
Carlton et al.

(10) Patent No.: US 10,172,344 B1
(45) Date of Patent: Jan. 8, 2019

(54) SYSTEM AND METHOD FOR GAME CALL HAVING AN OPEN FRAME AND NOTCH ABOVE A DIAPHRAGM

(71) Applicant: Carlton's Corporation, Inc., Montrose, CO (US)

(72) Inventors: L. Wayne Carlton, Montrose, CO (US); Ron Myron Bean, Cedar Rapids, IA (US)

( * ) Notice: Subject to any disclaimer, the term of this patent is extended or adjusted under 35 U.S.C. 154(b) by 0 days.

(21) Appl. No.: 15/872,674

(22) Filed: Jan. 16, 2018

Related U.S. Application Data

(60) Provisional application No. 62/528,479, filed on Jul. 4, 2017.

(51) Int. Cl.
    *A63H 5/00* (2006.01)
    *A01M 31/00* (2006.01)

(52) U.S. Cl.
    CPC .................. *A01M 31/004* (2013.01)

(58) Field of Classification Search
    None
    See application file for complete search history.

(56) References Cited

U.S. PATENT DOCUMENTS

| | | | | |
|---|---|---|---|---|
| 4,221,075 A | * | 9/1980 | Gallagher | A01M 31/004 446/202 |
| 4,341,037 A | * | 7/1982 | Moss | A01M 31/004 446/204 |
| 4,637,154 A | * | 1/1987 | Laubach | A01M 31/06 43/1 |
| 4,752,270 A | * | 6/1988 | Morton | A01M 31/004 446/202 |
| 4,761,149 A | * | 8/1988 | Laubach | A01M 31/004 446/205 |
| 4,960,400 A | * | 10/1990 | Cooper | A01M 31/004 446/207 |
| 5,415,578 A | * | 5/1995 | Jacobsen | A01M 31/06 446/207 |
| 5,735,725 A | * | 4/1998 | Primos | A01M 31/004 446/202 |
| 5,785,574 A | * | 7/1998 | Sears | A63H 5/00 446/208 |
| 5,803,785 A | * | 9/1998 | Primos, Jr. | A63H 5/00 446/188 |
| 6,179,684 B1 | | 1/2001 | Carlton | |

(Continued)

*Primary Examiner* — John E Simms, Jr.
*Assistant Examiner* — Urszula M Cegielnik
(74) *Attorney, Agent, or Firm* — Daniel W. Roberts; Law Offices of Daniel W. Roberts, LLC

(57) ABSTRACT

Provided are a system and method for a game call having an open frame and notch above a diaphragm. The game call includes a first frame having a top side and a bottom side, an exterior periphery and an interior periphery, and a longitudinal axis. A flexible diaphragm disposed in the first frame between the top side and the bottom side and across the interior periphery, the flexible diaphragm having side portions adjacent to the longitudinal axis and a central portion generally upon the longitudinal axis. An Open Arch Frame spans the interior periphery generally normal to the top side, the Open Arch Frame disposed above the flexible diaphragm and generally perpendicular to the longitudinal axis, the arch frame having a central air passage notch section, and opposing leg sections. An associated method of use is also provided.

58 Claims, 7 Drawing Sheets

(56) References Cited

U.S. PATENT DOCUMENTS

| | | |
|---|---|---|
| 6,471,563 B1 | 10/2002 | Carlton |
| 6,612,894 B2 | 9/2003 | Carlton |
| 6,755,714 B1 | 6/2004 | Huddleston |
| 6,953,378 B1 * | 10/2005 | Finley, Jr. ............ A01M 31/004 446/207 |
| 7,011,563 B2 | 3/2006 | Ady et al. |
| 7,011,564 B2 | 3/2006 | Ady et al. |
| 7,070,473 B1 | 7/2006 | Cassette |
| 7,083,492 B1 | 8/2006 | Morocco et al. |
| 7,553,210 B1 | 6/2009 | Keller, Jr. et al. |
| 7,963,819 B2 | 6/2011 | Keller, Jr. et al. |
| 8,016,638 B1 | 9/2011 | Kirby et al. |
| 8,025,548 B2 | 9/2011 | Kelle, Jr. et al. |
| 9,622,467 B2 | 4/2017 | Wiley |
| 2004/0209543 A1 | 10/2004 | Davis |
| 2005/0048868 A1 | 3/2005 | Ady et al. |
| 2005/0059318 A1 | 3/2005 | Ady et al. |
| 2007/0149087 A1 | 6/2007 | Keller et al. |
| 2007/0149088 A1 | 6/2007 | Keller et al. |
| 2007/0224908 A1 | 9/2007 | Vaught |
| 2008/0233830 A1 | 9/2008 | Drechsler |
| 2009/0068921 A1 | 3/2009 | Nagy |
| 2010/0279581 A1 | 11/2010 | Borhofen |

\* cited by examiner

SYSTEM AND METHOD FOR GAME CALL HAVING AN OPEN FRAME AND NOTCH ABOVE A DIAPHRAGM

CROSS REFERENCE TO RELATED APPLICATIONS

This application claims the benefit under 35 U.S.C. § 119(e) of U.S. Provisional Application No. 62/528,479 filed Jul. 4, 2017 and entitled SYSTEM AND METHOD FOR GAME CALL HAVING AN OPEN FRAME AND NOTCH ABOVE A DIAPHRAGM, the disclosure of which is incorporated herein by reference.

FIELD OF THE INVENTION

The present invention relates generally to devices for mimicking the calls of birds and/or other mammals. More specifically, the invention relates to a diaphragm based device placed in a user's mouth which permits airflow across both sides of the diaphragm and controlled movement of the diaphragm permitting consistent high-pitched mammal or bird simulating sounds.

BACKGROUND

In the past, hunters have often used diaphragm Game Calls which consist of a simple single or multiple layered latex reeds in a taped "U"-shaped flexible frame. While these types of diaphragm calls and others have enjoyed considerable use in the past, they have several serious drawbacks.

First of all, the typical diaphragm call forms the bottom end of a resonant chamber where the top end is the roof of the caller's mouth. This causes to exist a wide variation, across several callers, in the sounds produced by such calls, owing to the variations in the mouth shapes of these several callers. Similarly, because the typical diaphragm call will properly seal in only a small range of positions in a single caller's mouth, it is often difficult for a single caller to produce sounds having a wide tonal variety.

Secondly, these diaphragm calls generally require the hunter or caller to possess a relatively high level of skill. The typical diaphragm call must be carefully sealed to the roof of the mouth of the caller before the desired sounds can be produced. Lastly, many hunters experience a gag reflex when attempting to seal a typical diaphragm call to the roof of their mouth.

More specifically, for high-pitched sounds, only a small portion of the diaphragm need actually move. As this portion is quite small in relation to the size of the average user's mouth, this can present a challenge as the call must be consistently placed within the mouth and air must be directed past the diaphragm so as to induce vibration. Even for a given animal such as a wild turkey or an elk, a good and attractive call is not one frequency or pitch. Typically there is modulation and a cadence desired such that Game Call must be capable of making more than one or two specific sounds.

Thus the challenge for the call user to learn how to place the call within his or her mouth, how to position his or her tongue, and how best to blow air and at what pressure, to cause desired vibration of the diaphragm. Users who have false teeth, missing teeth, or even no teeth may have additional challenges as well as teeth are often used to brace the tongue.

For typical use of a mouth call, the user disposes the game call in his or her mouth with the open portion of the horseshoe and the leading edge of the flexible diaphragm facing out of the mouth to the front. The user tries to train his or her tongue to push up with the tongue on the bottom of the flexible diaphragm and blows air past the diaphragm.

Efforts have been made to address and overcome some of these issues U.S. Pat. Nos. 6,179,684, 6,471,563, 6,612,894 to Carlton are a family of related patent presenting systems and methods for a game call having an integral resonance chamber. Some of these are intended for use in a person's mouth, while other variations are intended for use as an external call. While advantageous over prior devices in some respects, the resonance chamber itself presents issues, such as the undesirable consequence of the resonance chamber being small and trapping sound within the resonance chamber. In addition, as the chamber is effectively sealed on all sides save for the leading edge of the diaphragm, air blown by the user does not circulate above the diaphragm and within the chamber.

For certain sounds, not enough air circulation is permitted by the sealed chamber, and some sounds require that air be permitted to pass over the top as well as the bottom—which is entirely prevented by the joined resonance chamber.

While the Carlton game calls are certainly an improvement in many respects, they fall short of a truly dynamic call that can consistently produce a wide range of high-pitched stimulating sounds that require larger resonance space, alternating resonance spaces, and/or potentially air passage over the top of the diaphragm as well as the bottom.

Hence there is a need for a method and system that is capable of overcoming one or more of the above identified challenges.

SUMMARY OF THE INVENTION

Our invention solves the problems of the prior art by providing novel systems and methods for a Game Call having an open frame and notch above a diaphragm.

In particular, and by way of example only, according to one embodiment of the present invention, provided is a Game Call having an open frame and notch above a diaphragm including: a first frame having a Top Side and a Bottom Side, an Exterior Periphery and an Interior Periphery, and a Longitudinal Axis; a Flexible Diaphragm disposed in the first frame Frame between the Top Side and the Bottom Side and across the Interior Periphery, the Flexible Diaphragm having side portions adjacent to the Longitudinal Axis and a central portion generally upon the Longitudinal Axis; an Open Arch Frame spanning the Interior Periphery generally normal to the Top Side, the Open Arch Frame disposed above the Flexible Diaphragm and generally perpendicular to the Longitudinal Axis, the Arch Frame having a central Air Passage Notch section, and opposing Leg Sections.

In yet another embodiment, provided is a Game Call having an open frame and notch above a diaphragm including: a U-Shaped Frame having a Top Side and a Bottom Side, an Exterior Periphery and an Interior Periphery, and a Longitudinal Axis; a Flexible Diaphragm disposed in the U-Shaped Frame between the Top Side and the Bottom Side and across the Interior Periphery, the Flexible Diaphragm having side portions adjacent to the Longitudinal Axis and a central portion generally upon the Longitudinal Axis; an Open Arch Frame spanning the Interior Periphery generally perpendicular to the Longitudinal Axis and generally normal to the Top Side and disposed above the Flexible Diaphragm, the Arch Frame having a central Air Passage Notch section, and opposing Leg Sections, the opposing Leg Sections structured and arranged to limit the upward motion of the side portions of the diaphragm, the Air Passage Notch section structured and arranged to provide an air passage above the central portion and permit upward motion of the central portion when the side portions are otherwise restrained by the Leg Sections.

Further still, in yet another embodiment provided is a method for calling game with a call having an open frame and notch above a flexible diaphragm including: inserting a Game Call for producing calls of varying frequency in a human mouth, the Game Call including; a U-Shaped Frame having a Top Side and a Bottom Side, an Exterior Periphery and an Interior Periphery, and a Longitudinal Axis; a Flexible Diaphragm disposed in the U-Shaped Frame between the Top Side and the Bottom Side and across the Interior Periphery, the Flexible Diaphragm having side portions adjacent to the Longitudinal Axis and a central portion generally upon the Longitudinal Axis; an Open Arch Frame spanning the Interior Periphery generally normal to the Top Side, the Open Arch Frame disposed above the Flexible Diaphragm and generally perpendicular to the Longitudinal Axis, the Arch Frame having a central Air Passage Notch section, and opposing Leg Sections; placing the Game Call near the front of the mouth, the Open Arch Frame assisting in angling the call within the mouth; pressing the Game Call against the roof of the mouth; causing air to flow past the diaphragm, the air causing the Flexible Diaphragm to move against the Open Arch Frame and vibrate within the central Air Passage Notch section.

DETAILED DESCRIPTION

Before proceeding with the detailed description, it is to be appreciated that the present teaching is by way of example only, not by limitation. The concepts herein are not limited to use or application with a specific system or method for flexible diaphragm based calls such as diaphragm Game Calls. Thus, although the instrumentalities described herein are for the convenience of explanation shown and described with respect to exemplary embodiments, it will be understood and appreciated that the principles herein may be applied equally in other types of systems and methods involving diaphragm calls, such as more specifically diaphragm Game Calls.

This invention is described with respect to preferred embodiments in the following description with reference to the Figures, in which like numbers represent the same or similar elements. Further, with the respect to the numbering of the same or similar elements, it will be appreciated that the leading values identify the Figure in which the element is first identified and described, e.g., element 100 first appears in FIG. 1.

Figure 1:
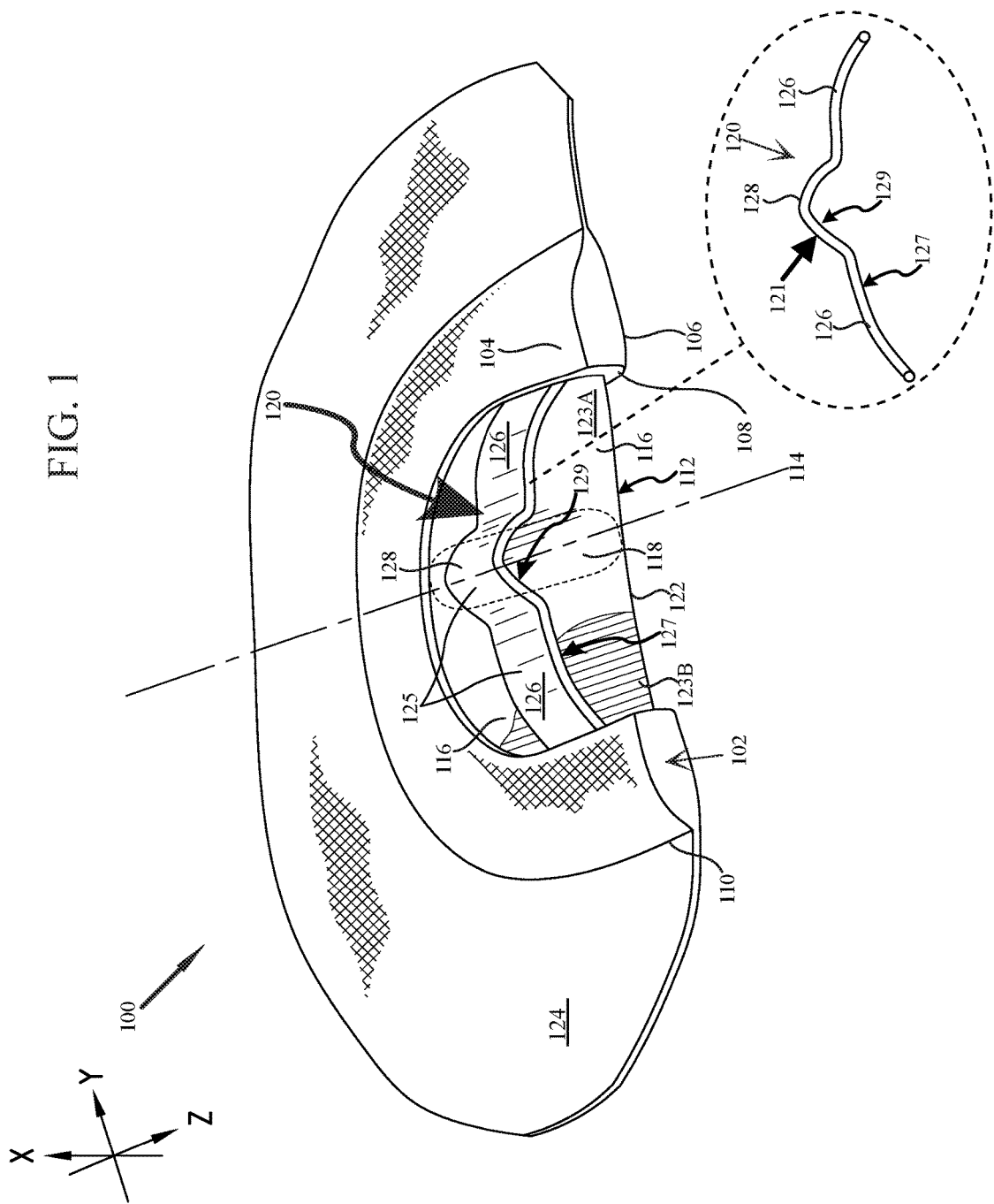
FIG. 1 is a top perspective view of the Game Call having an open frame and notch above a flexible diaphragm in accordance with at least one embodiment.

Turning now to FIG. 1 there is shown an exemplary embodiment of a Game Call having an open frame and notch above a diaphragm, hereinafter Game Call 100.

To facilitate the description of systems and methods for this Game Call 100, the orientation of Game Call 100 as presented in the figures are referenced to a coordinate system with three axes orthogonal to one another as shown in FIG. 1. The axes intersect mutually at the origin of the coordinate system, which is chosen to be the center of the Game Call 100, however the axes shown in all figures are offset from their actual locations for clarity and ease of illustration.

As shown, Game Call 100 is comprised principally of a first frame 102 frame 102, having a Top Side 104, and a Bottom Side 106, an Interior Periphery 108 and an Exterior Periphery 110. A Flexible Diaphragm 112 is disposed in first frame 102 across at least a portion of the Interior Periphery 108. Moreover, for at least one embodiment, the first frame 102 is a U-shaped frame 102.

For at least one embodiment the Flexible Diaphragm 112 is disposed in the U-shaped frame 102 between the Top Side 104 and the Bottom Side 106 and across the Interior Periphery 108. For further ease of description, it is convenient to note that the Game Call 100 has a Longitudinal Axis 114. For at least one embodiment, the Flexible Diaphragm 112 is appreciated to have side portions 116 adjacent to the Longitudinal Axis 114, and a central portion 118 generally upon the Longitudinal Axis 114.

As is clearly evident from FIG. 1 an open frame extends above across the U-shaped frame 102. This open frame may be described as an Open Arch Frame 120 as it is generally symmetrical and generally comprised of curved sections. However, description as an Open Arch Frame 120 should not be taken as a limitation to imply that the open frame structure is indeed always symmetrical, and/or does not contain generally straight members.

As shown, the Open Arch Frame 120 is disposed above the U-shaped frame 102 such that the Open Arch Frame 120 spans the Interior Periphery 108 general normal to the Top Side 104, and above the Flexible Diaphragm 112. Further, this Open Arch Frame 120 is generally perpendicular to the Longitudinal Axis 114.

For at least one embodiment, the Open Arch Frame 120 is disposed proximate to the leading edge 122 of the Flexible Diaphragm 112. For yet another embodiment, the Open Arch Frame 120 is disposed back from the leading edge 122 of the Flexible Diaphragm 112.

For still yet another embodiment, the Open Arch Frame 120 may be structured and arranged such that a Game Call 100 user may slide the Open Arch Frame 120 along the sides of the U-shaped frame 102, and thereby change the location of the Open Arch Frame 120 relative to the leading edge 122 of the Flexible Diaphragm 112.

For at least one embodiment, the Flexible Diaphragm 112 is a latex membrane. Other flexible materials may be selected such as, but not limited to, paper, plastic, rubber, reed, metal foil, cloth and combinations thereof. For at least one embodiment, multiple layers 123 of material, of which first layer 123A and 123B are exemplary, such as but not limited to latex, may be provided as the diaphragm.

It will be appreciated that the Open Arch Frame 120 helps a user center the Game Call 100 in his or her mouth. Indeed, with the Open Arch Frame 120 a single layer Flexible Diaphragm 112 may be used, and will the user to create very high pitch simulating sounds.

Although at least one layer 123A of the Flexible Diaphragm 112 is continuous across the Interior Periphery 108 as shown, for at least one alternative embodiment, at least one additional layer 123B of flexible material may be provided as a component of the Flexible Diaphragm 112, the at least one additional layer extending only part way across the Interior Periphery 108.

For at least one embodiment, this partial layer may extend from the base of the U towards the distal ends of the U, but ends short of the leading edge 122 of the Flexible Diaphragm 112 as shown, such that the partial layer is generally symmetrically disposed on either side of the of the Longitudinal Axis 114.

For at least one alternative embodiment, this partial layer may extend from one side of the U-shaped frame 102 towards the other, but fall short, such that more of the partial layer is on one side of the Longitudinal Axis 114 then the other. In addition, for yet at least one further embodiment, the exposed edge of the incomplete or partial layer may be frayed.

As shown for the embodiment depicted, a flexible material 124 may be disposed at least partially about the U-shaped frame 102 and extend away therefrom so as to provide a larger structure with a flexible exterior. This flexible exterior area may facilitate position with a person's mouth, or placement within an external call chamber.

For at least one embodiment, the flexible material 124 is a cloth type material, such as, but not limited to, canvas, or laminated canvas. For at least one embodiment, this flexible material 124 may provide printing and/or graphics. Further still, such printing and/or graphics may be provided under or as part of a transparent laminate layer such that the ink or material providing the printing and/or graphics is protected from directly contacting the tissues in a person's mouth.

Returning to the Open Arch Frame 120, as shown, this structure spans from one side of the U-shaped frame 102 to the other, and for at least one embodiment is provided by clearly defined sections. Moreover, for at least one embodiment the Open Arch Frame 120 may be described as a structure having an inconsistent radius of curvature. More specifically, as shown in the FIGs. The Open Arch Frame 120 is clearly comprised of multiple sections which do not collectively conform to a single and continuous portion of a circle. Moreover, as noted above, for at least one embodiment the Open Arch Frame 120 is composed of multiple curved sections 125, the Leg Section 126 having a first curvature 127, and the Air Passage Notch 128 having at least a second curvature 129. As shown, for at least one embodiment the first curvature 127 of the leg sections 126 is different from the second curvature 129 of the Air Passage Notch 128.

More specifically, for the embodiment as shown, the Open Arch Frame 120 has opposing Leg Sections 126 rising towards each other from opposing ends of the U-shaped frame 102 and a central Air Passage Notch 128 there between. This Air Passage Notch 128 may also be referred to as a Tone Slot.

For at least one embodiment, the Open Arch Frame 120 is provided by formed metal such as a strip, as shown. For at least one alternative embodiment, the Open Arch Frame 120 is provided by a wire, such as a rounded wire 121, shown in dotted oval detail. For yet still another alternative embodiment, the Open Arch Frame 120 is provided by a plastic material.

Moreover, for at least one embodiment, the Open Arch Frame 120 may be provided by the same material providing the U-shaped frame 102 as the entire structure is press cut, injection molded, 3D printed, milled, or otherwise provided from a suitable medium such as, but not limited to aluminum, stainless steel, pliable metal, fiber, polycarbonate, epoxy resin, composite plastic, fiberglass, and combinations thereof. Moreover, the U-shaped frame 102 and Open Arch Frame 120 are generally provided by a generally ridged, rugged, non-porous, light weight and inexpensive durable material.

To briefly summarize, provided is a system and method that permits a Game Call 100 having an open frame and notch above a diaphragm. This Game Call 100 is provided by a U-shaped frame 102 having a Top Side 104 and a Bottom Side 106, an Exterior Periphery 110 and an Interior Periphery 108, and a Longitudinal Axis 114; a Flexible Diaphragm 112 disposed in the U-shaped frame 102 between the Top Side 104 and the Bottom Side 106 and across the Interior Periphery 108, the Flexible Diaphragm 112 having side portions 116 adjacent to the Longitudinal Axis 114 and a central portion 118 generally upon the Longitudinal Axis 114; an Open Arch Frame 120 spanning the Interior Periphery 108 generally normal to the Top Side 104, the Open Arch Frame 120 disposed above the Flexible Diaphragm 112 and generally perpendicular to the Longitudinal Axis 114, the Open Arch Frame 120 having a central Air Passage Notch 128 section, and opposing Leg Sections 126.

Figure 2:
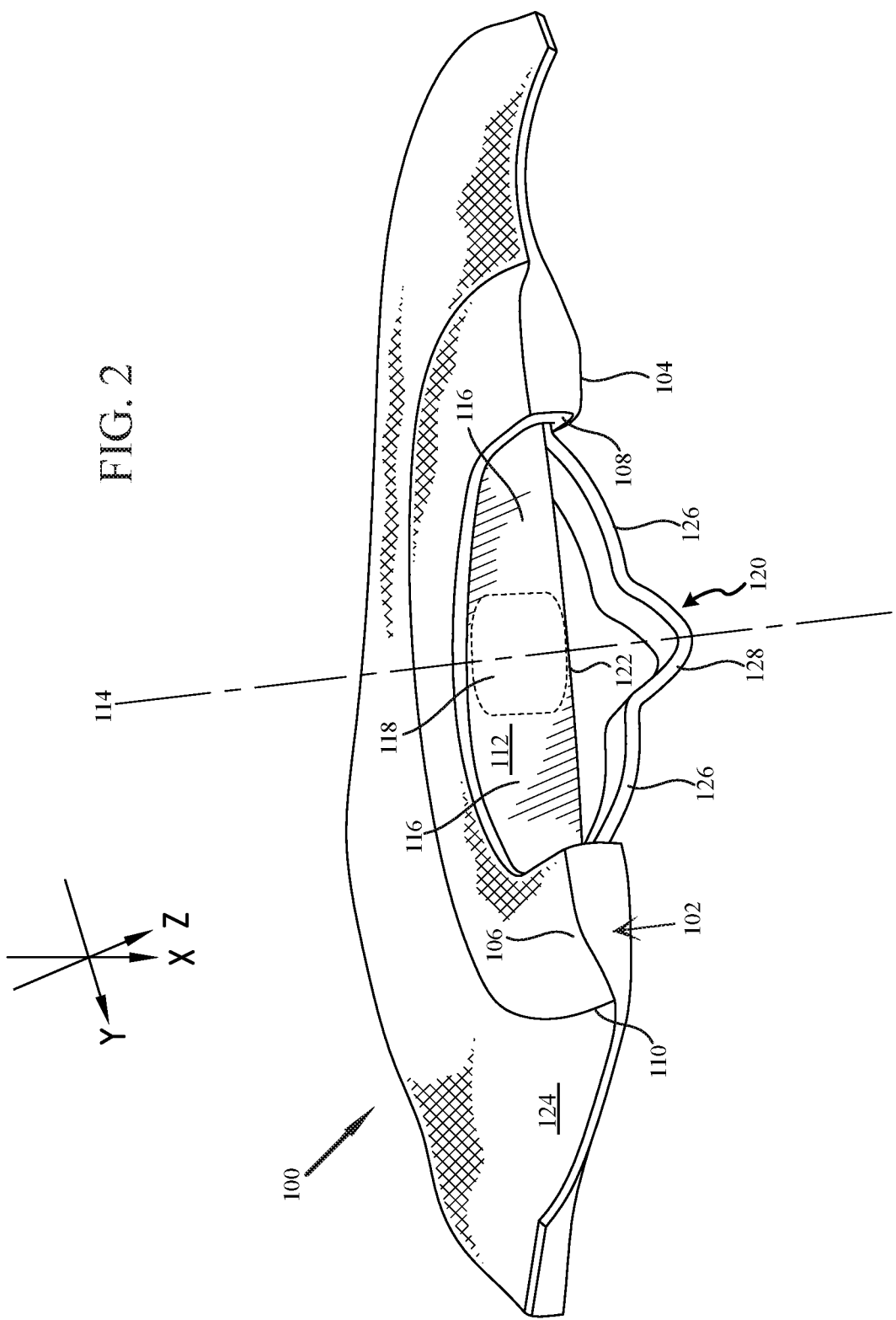
FIG. 2 is a bottom perspective view of the Game Call having an open frame and notch above a flexible diaphragm in accordance with at least one embodiment.

With respect to FIG. 1, FIG. 2 is an inverted view of the Game Call 100. The Flexible Diaphragm 112 is again appreciated to be disposed within and across the internal periphery of the U-shaped frame 102. In FIG. 2, the position of the Open Arch Frame 120 may be further appreciated and as shown, in this initial state, the Flexible Diaphragm 112 is not substantially in contact with the Open Arch Frame 120.

With respect to FIGS. 1 and 2, it is also clearly appreciated that the Open Arch Frame 120 is substantially unobstructed, which is to say that air flowing between the Open Arch Frame 120 and the Flexible Diaphragm 112 is not substantially obstructed or otherwise contained by a structure.

Moreover, the Open Arch Frame 120 is an open structure and not an entrance into an enclosed structure—the passage of air through the Open Arch Frame 120 and Air Passage Notch 128 is indeed directed by at least the Air Passage Notch 128, but the air flow is substantially unrestrained from continuing across the Flexible Diaphragm 112 by the Game Call 100 itself.

When a User desires to create a call with the Game Call 100, for at least one embodiment he or she will dispose the Game Call 100 within his or her mouth and direct the flow of air past the Flexible Diaphragm 112. Although the Game Call 100 can, and will, accommodate a wide variety of different calls, the range of potential calls is at least partially determined by the width of the Air Passage Notch 128.

Figure 3:
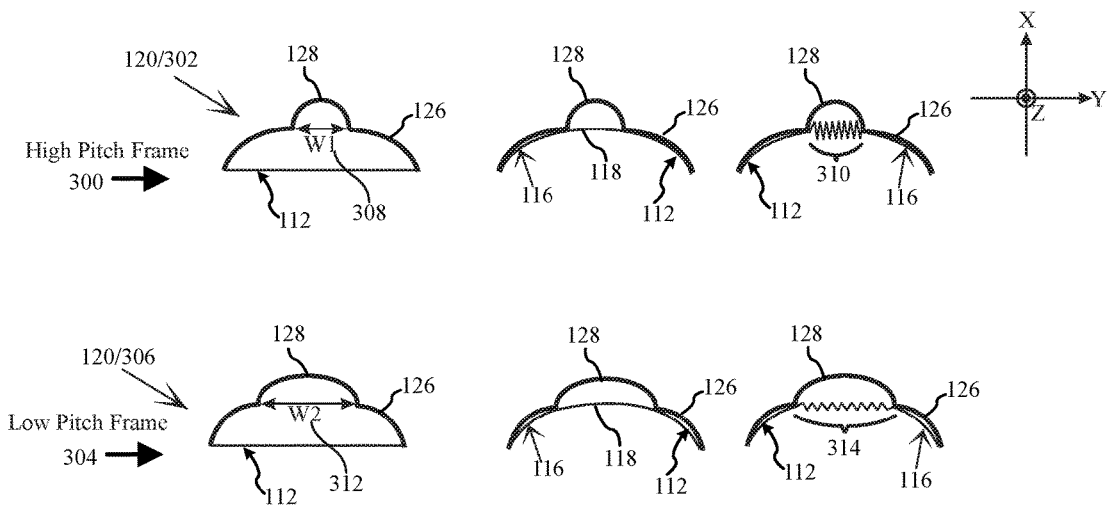
FIG. 3 is a side view of the open frame and notch above a flexible diaphragm presenting illustrated comparison for a high pitch frame and a low pitch frame in accordance with varying embodiments.

FIG. 3 presents simplified cross-sectional views depicting only the Open Arch Frame 120 and the Flexible Diaphragm 112—the top row 300 of illustrations presenting a high-pitched frame 302 and the bottom row 304 of illustrations presenting a low-pitched frame 306.

For both, when initially at rest, the Flexible Diaphragm 112 is below the Open Arch Frame 120. As air flow is applied, and air pressure increases, either as direct flow against the Flexible Diaphragm 112 or as indirect flow above the Flexible Diaphragm 112, the Flexible Diaphragm 112 will distort and rise up against the Leg Sections 126 of the Open Arch Frame 120.

As is shown, initially in the middle figure of each row 300, 304 the side portions 116 of the Flexible Diaphragm 112 are engaging against the Leg Sections 126, while the central portion 118 remains substantially free and unengaged as it is disposed below the air passage notch 128.

For some embodiments, the User's tongue may be employed to at least initially seat the side portions 116 of the Flexible Diaphragm 112 against the Leg Sections 126. Moreover, the Leg Sections 126 are structured and arranged to limit the upward motion of the side portions 116 of the Flexible Diaphragm 112.

As shown, the Air Passage Notch 128 provides an open space above the central portion 118 of the Flexible Diaphragm 112. As air flow increases, the leading edge 122 of the central portion 118 of the Flexible Diaphragm 112 will begin to vibrate as it is substantially unrestrained directly by the Open Arch Frame 120, and more specifically the Air Passage Notch 128. Conversely, the side portions 116 of the Flexible Diaphragm 112 are now disposed against the Leg Sections 126 of the Open Arch Frame 120 and as such are substantially restrained from excessive vibration.

In other words, the Air Passage Notch 128 is structured and arranged to consistently provide an air passage above the central portion of the Flexible Diaphragm 112 and permit upward motion of the central portion when the side portions are otherwise restrained by the Leg Sections 126.

Moreover, the Air Passage Notch 128 ensures that air flow is directed over the same spot on the flexile diaphragm, e.g. the central portion 118—it is not a matter for the user to control his or her mouth and tongue—the Game Call 100 itself, and more specifically the Air Passage Notch 128 ensures consistency.

It is this consistency of sound, or tone, that has coined the term Tone Slot or Tone Notch for the Air Passage Notch 128 as noted above. This aspect cannot be understated—the Air Passage Notch 128 permits a User to generate consistent quality calls for game with minimal practice. To summarize, the Open Arch Frame 120 serves to help position the Game Call 100 within the users mouth and the Air Passage Notch 128 ensures air flow is directed over the same central portion 118 of the Flexible Diaphragm 112 thus providing consistently reproducible calls.

As the unrestrained central section vibrates, it produces the high pitch sound to emulate the call of a bird or animal. For the top row 300 of illustrations, depicting a high pitch frame 302, the width W1 308 of the Air Passage Notch 128 for the high pitch frame 302 is relatively narrow, and as such the width of the vibrating central section of the Flexible Diaphragm 112 is relatively short and the range of the oscillation is high, as shown by the representative line 310.

For the bottom row 304 of illustrations, depicting a lower pitch frame 306, the width W2 312 of the Air Passage Notch 128 for the low pitch frame 306 is considerably wider, and as such the width of the vibrating central section of the Flexible Diaphragm 112 is longer—about twice that of the high pitch frame 302, as shown by the representative line 314.

As such, the oscillation is lower, as shown by the representative line 314 being narrower and less dense with peaks and valleys. This is not to say that a skilled user cannot achieve high or low pitch calls with either frame—but in the main, the difference in configuration permits greater consistency with achieving a high pitch call vs. a low pitch call.

As the operator controls the flow of the air, varying the intensity, flow rate, bursts, and overall seal of the Game Call against the roof of the mouth or the tongue, a large variety of different calls may be achieved. In addition, the Air Passage Notch 128 ensures that at least the central portion 118 of the Flexible Diaphragm 112 remains free for movement and is not crushed against the roof of the user's mouth. Further, as the Open Arch Frame 120 is not a component of a resonance chamber provided as a component of the Game Call 100 itself, the produced sounds are not trapped by the Game Call 100 itself.

Figure 4:
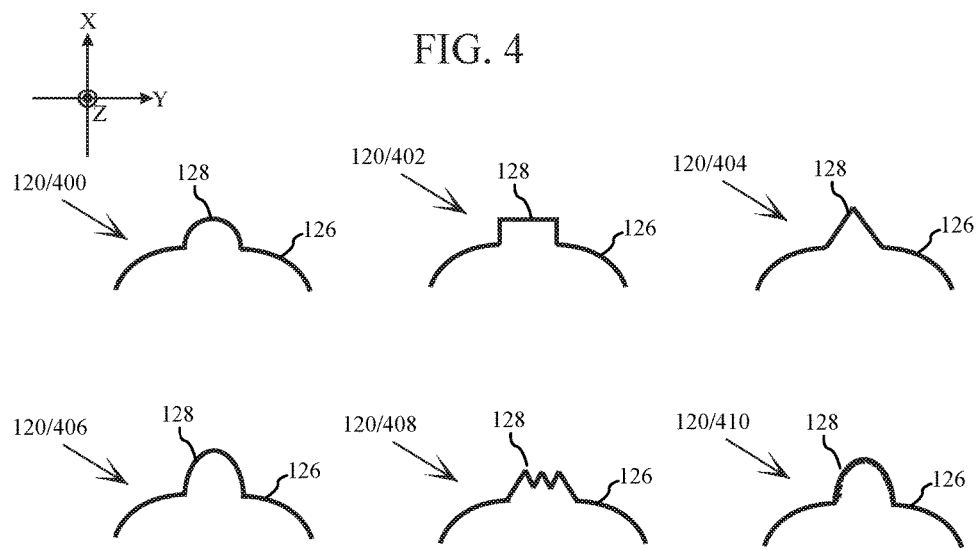
FIG. 4 presents a series of side views depicting various, but not exclusive, options for the Open Arch Frame and notch in accordance with varying embodiments.

FIG. 4 presents a collection of additional optional configurations for the Air Passage Notch 128, such as but not limited to, partial circle 400, rectangular 402, triangular 404, arch 406, ridged 408 and/or grooved 410. Moreover, different configurations for the Air Passage Notch 128, and indeed whether the underside of the Air Passage Notch 128 is smooth or textured, may provide different options for how air flow is directed past the central portion 118 of the Flexible Diaphragm 112, the nature of the vibration oscillation that is thus induced, and correspondingly the type of call emitted by the Game Call 100.

With respect to the variations suggested in FIG. 4, it should also be appreciated that for at least one embodiment, the leg sections 126 terminate in open space without a physical arch structure there between. However, the Air Passage Notch in one form or another has been found highly advantageous in assisting the user to maintain space over the Flexible Diaphragm 112 and thus ensure that the central portion 118 has sufficient room for proper vibration.

Figure 5:
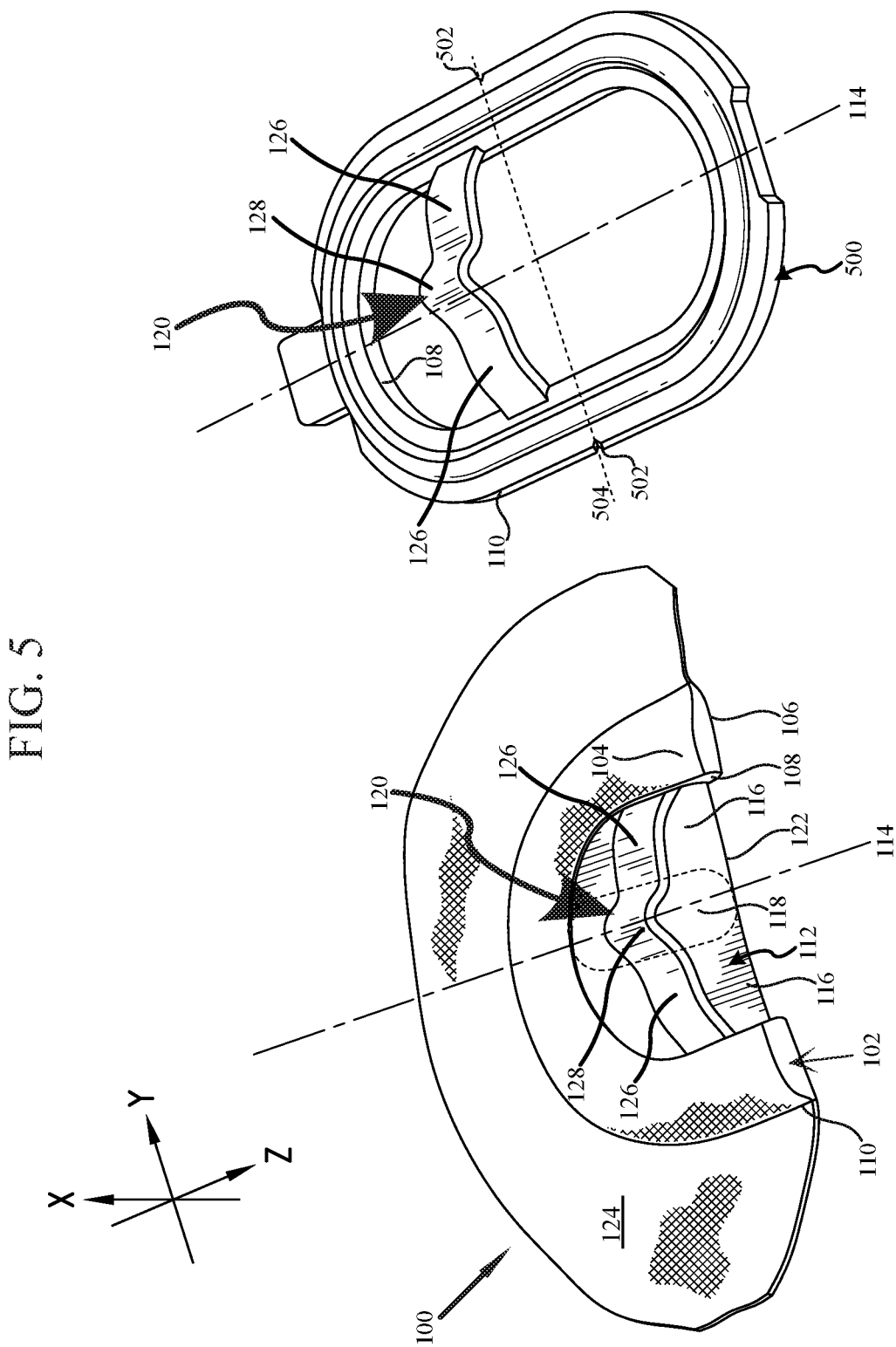
FIG. 5 is a top perspective view of the Game Call having an open frame and notch above a flexible diaphragm and the supporting frame element which provides the U-Shaped Frame, in accordance with at least one embodiment.

FIG. 5 presents a perspective view of the Game Call 100 adjacent to an embodiment of the element 500 providing the U-Shaped Frame 102 and Open Arch Frame 120 of the Game Call 100. For the embodiment as shown, this element 500 has been stamped from aluminum. Side notches 502 provide points about which the element 500 is bent (further represented by dotted line 504) so as to provide the U-Shape and bind upon at least one piece of a flexible material disposed so as to provide the Flexible Diaphragm 112.

Figure 6:
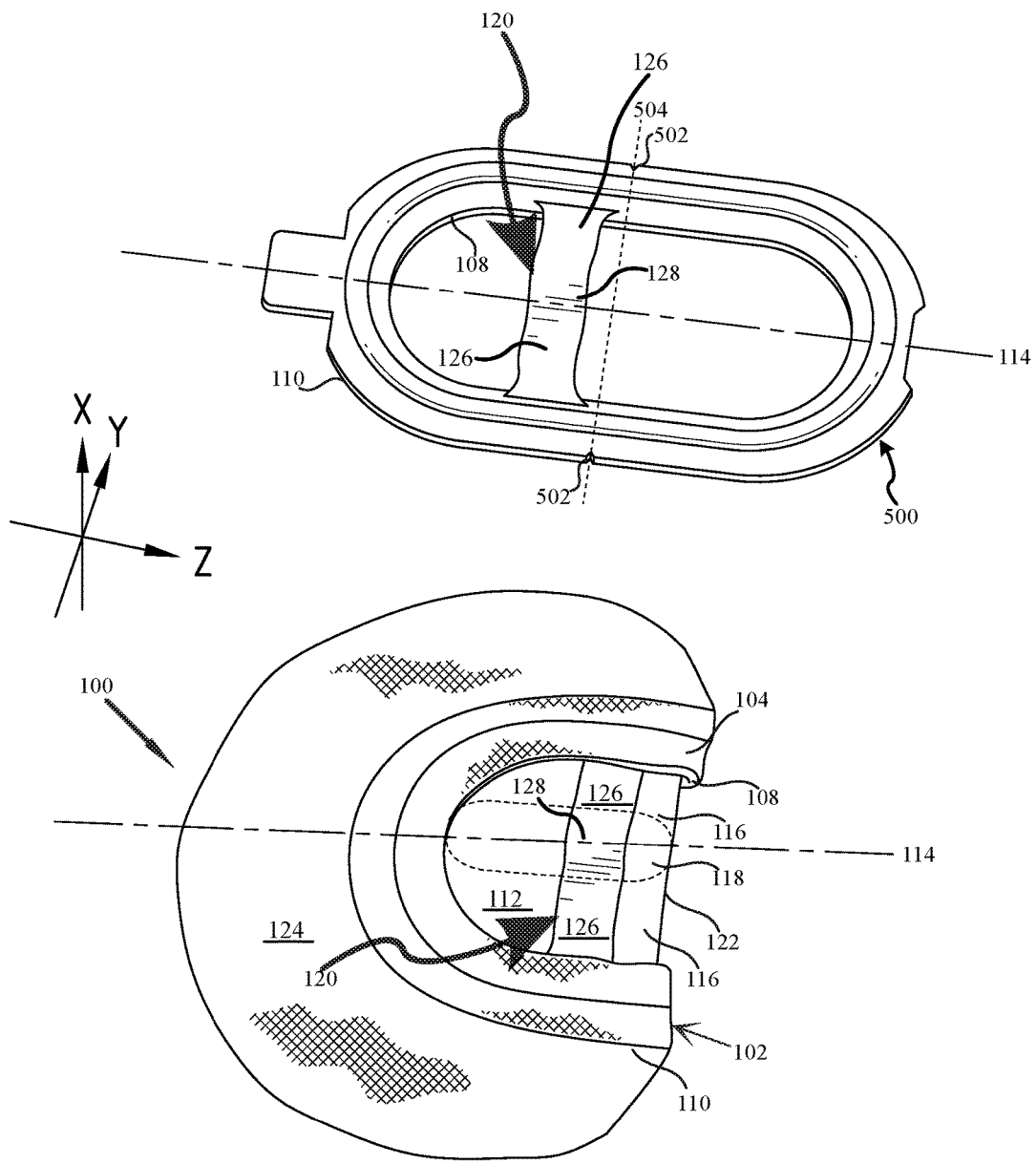
FIG. 6 is a side perspective view of the Game Call having an open frame and notch above a flexible diaphragm and the supporting frame element which provides the U-Shaped Frame, in accordance with at least one embodiment.

FIG. 6 presents a side perspective view of the Game Call 100 adjacent to an embodiment of the element 500 providing the U-Shaped Frame 102 and Open Arch Frame 120 of the Game Call 100 as shown in FIG. 5.

Figure 7:
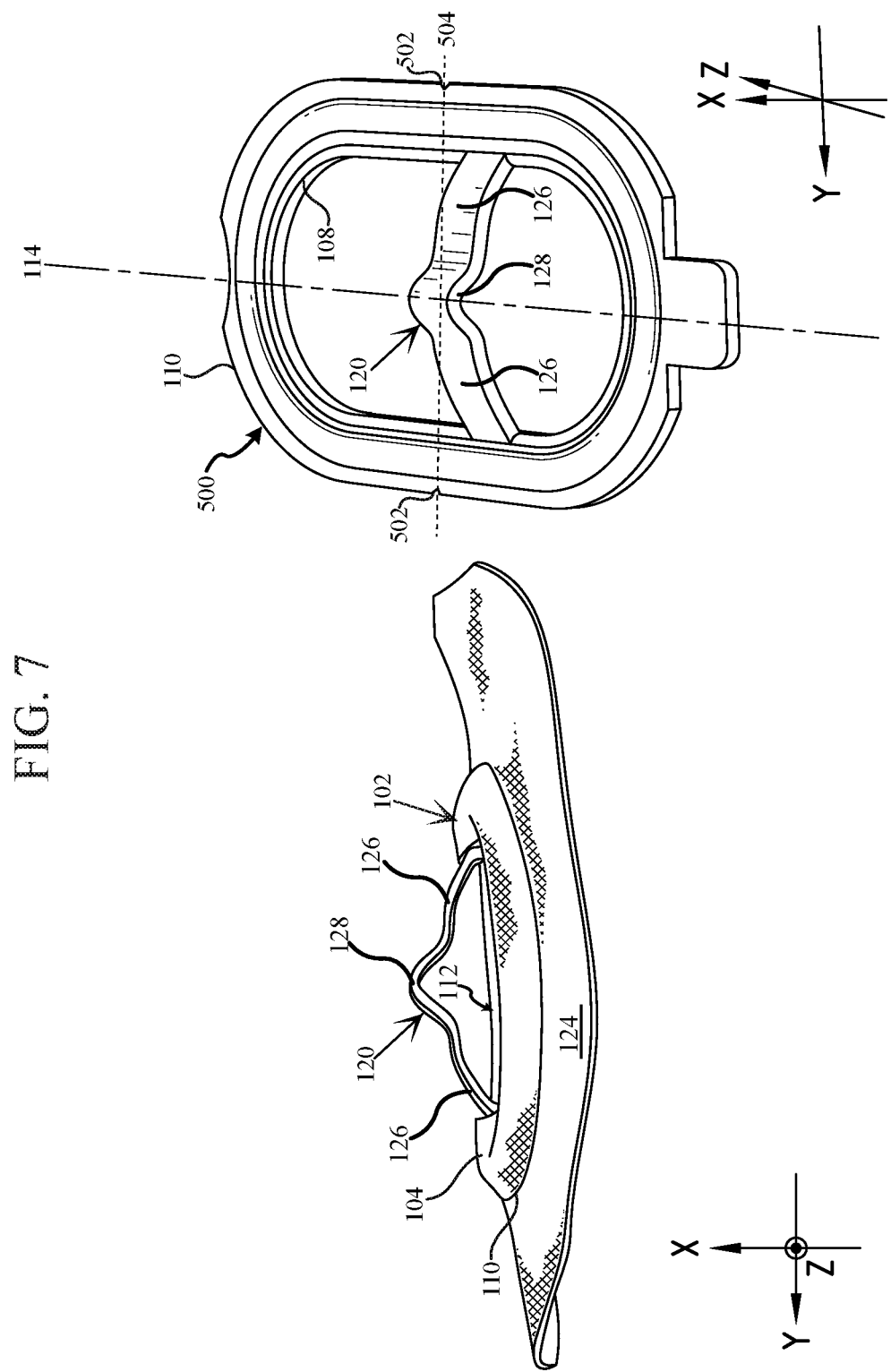
FIG. 7 is a top, end on perspective view of the Game Call having an open frame and notch above a flexible diaphragm and the supporting frame element which provides the U-Shaped Frame, in accordance with at least one embodiment.
Figure 8:
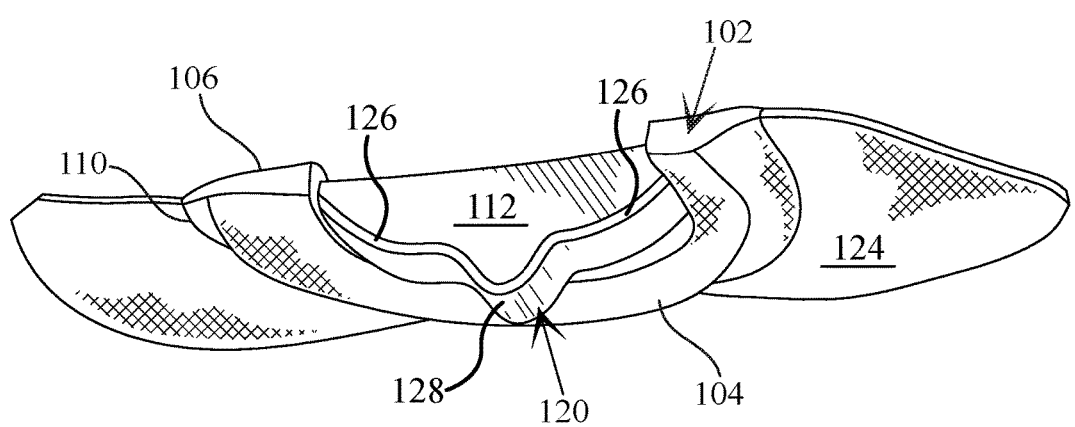
FIG. 8 is a bottom, end on perspective view of the Game Call having an open frame and notch above a flexible diaphragm and the supporting frame element which provides the U-Shaped frame, in accordance with at least one embodiment.

FIG. 7 provides a top end view of the Game Call 100 in which once again the nature of the Open Arch Frame 120, it's leg sections 126 and the Air Passage Notch 128 may be once again appreciated as being un-obstructed. FIG. 8 provides a similar view from the front of the Game Call 100, the Game Call 100 being inverted.

Moreover, to summarize the above descriptions, for at least one embodiment, provided is a Game Call 100 having an open frame 120 and notch above a flexible diaphragm including: a U-shaped frame 102 having a Top Side 104 and a Bottom Side 106, an Exterior Periphery 110 and an Interior Periphery 108, and a Longitudinal Axis 114; a Flexible Diaphragm 112 disposed in the U-shaped frame 102 between the Top Side 104 and the Bottom Side 106 and across the Interior Periphery 108, the Flexible Diaphragm 112 having side portions 116 adjacent to the Longitudinal Axis 114 and a central portion 118 generally upon the Longitudinal Axis 114; an Open Arch Frame 120 spanning the Interior Periphery 108 generally perpendicular to the Longitudinal Axis 114 and generally normal to the Top Side 104 and disposed above the Flexible Diaphragm 112, the Open Arch Frame 120 having a central Air Passage Notch 128 section, and opposing Leg Sections 126, the opposing Leg Sections 126 structured and arranged to limit the upward motion of the side portions 116 of the flexible diaphragm 112, the Air Passage Notch 128 section structured and arranged to provide an air passage above the central portion 118 and permit upward motion of the central portion 118 when the side portions 116 are otherwise restrained by the Leg Sections 126.

Having discussed the nature of the structure of the Game Call 100, it will be appreciated that at least one other embodiment of the present invention is provided by a method for calling game with a Game Call 100 as described.

Moreover, for at least one embodiment, provided is a method for calling game with a Game Call 100 having an open frame and notch above a flexible diaphragm including: inserting a Game Call 100 for producing calls of varying frequency in a human mouth, the Game Call 100 including; a U-shaped frame 102 having a Top Side 104 and a Bottom Side 106, an Exterior Periphery 110 and an Interior Periphery 108, and a Longitudinal Axis 114; a Flexible Diaphragm 112 disposed in the U-shaped frame 102 between the Top Side 104 and the Bottom Side 106 and across the Interior Periphery 108, the Flexible Diaphragm 112 having side portions 116 adjacent to the Longitudinal Axis 114 and a central portion 118 generally upon the Longitudinal Axis 114; an Open Arch Frame 120 spanning the Interior Periphery 108 generally normal to the Top Side 104, the Open Arch Frame disposed above the Flexible Diaphragm 112 and generally perpendicular to the Longitudinal Axis 114, the Open Arch Frame 120 having a central Air Passage Notch 128 section, and opposing Leg Sections 126; placing the Game Call 100 near the front of the mouth, the Open Arch Frame assisting in angling the call within the mouth; pressing the Game Call 100 against the roof of the mouth; causing air to flow past the Flexible Diaphragm 112, the air causing the Flexible Diaphragm 112 to move against the Open Arch Frame 120 and central portion 118 to vibrate within the Air Passage Notch 128 section.

Changes may be made in the above methods, systems and structures without departing from the scope hereof It should thus be noted that the matter contained in the above description and/or shown in the accompanying drawings should be interpreted as illustrative and not in a limiting sense Indeed many other embodiments are feasible and possible, as will be evident to one of ordinary skill in the art The claims that follow are not limited by or to the embodiments discussed herein, but are limited solely by their terms and the Doctrine of Equivalents.

What is claimed:
1. A diaphragm game call comprising:
 a first frame having a top side and a bottom side, an exterior periphery and an interior periphery, and a longitudinal axis;
 a flexible diaphragm disposed in the first frame between the top side and the bottom side and across the interior periphery, the flexible diaphragm having side portions adjacent to the longitudinal axis and a central portion generally upon the longitudinal axis;
 an Open Arch Frame spanning the interior periphery generally normal to the top side, the Open Arch Frame disposed above the flexible diaphragm and generally perpendicular to the longitudinal axis, the arch frame having a central air passage notch section, and opposing leg sections rising towards each other below the air passage notch section;
 wherein the flexible diaphragm has a leading edge having side portions adjacent to the longitudinal axis and a central portion generally upon the longitudinal portion, the Open Arch Frame disposed across the interior periphery such that when the flexible diaphragm is made to vibrate, the side portions of the leading edge of the flexible diaphragm are in contact with the opposing leg sections.

2. The game call of claim 1, wherein the first frame is a U-shaped frame.

3. The game call of claim 1, wherein the Open Arch Frame is formed from a metal strip.

4. The game call of claim 1, wherein the Open Arch Frame is formed from rounded wire.

5. The game call of claim 1, wherein the Open Arch Frame is formed from a composite material.

6. The game call of claim 1, wherein the central air passage notch section is a tone slot.

7. The game call of claim 1, wherein the underside of the air passage notch section is grooved.

8. The game call of claim 1, wherein the underside of the air passage notch section is ridged.

9. The game call of claim 1, wherein the underside of the air passage notch section is textured to provide turbulence to air flow.

10. The game call of claim 1, wherein the air passage notch is an arch.

11. The game call of claim 1, wherein the air passage notch is rectangular.

12. The game call of claim 1, wherein the air passage notch is a portion of a circle.

13. The game call of claim 1, wherein position of the Open Arch Frame is user adjustable.

14. The game call of claim 1, wherein the Open Arch Frame is structured and arranged to position the call within a person's mouth in a consistent position.

15. The game call of claim 1, wherein the leg sections and the open air passage notch section permit varying lengths of the central portion of the leading edge of the diaphragm to be vibrate, the game call thereby permitting a range of different frequency calls.

16. The game call of claim 1, wherein for the Open Arch Frame, the opposing leg sections rising from the top of the U-shaped frame and curving towards each other with a first curvature, the air passage notch section transitioning to a second curvature different from the first curvature.

17. The game call of claim 1, wherein the Open Arch Frame is provided by the air passage notch section having side walls at opposing first angles, and the opposing leg sections having opposing second angles different from the first angles.

18. The game call of claim 1, wherein the partial restraint of the flexible diaphragm side portions and unrestrained motion of the central portion of the flexible diaphragm permits precise sound modulation.

19. The game call of claim 1, wherein the air passage notch section has a width spanning the longitudinal axis correlating to a first central portion of the flexible diaphragm permitted unrestrained upward motion, the leg sections correlating to second side portions of the flexible diaphragm that restrain upward motion, the ratio of the first central portion permitted by the width to the second side portions selected to permit low frequency calls.

20. The game call of claim 1, wherein the air passage notch section has a width spanning the longitudinal axis correlating to a first central portion of the flexible diaphragm permitted unrestrained upward motion, the leg sections correlating to second side portions of the flexible diaphragm that restrain upward motion, the ratio of the first central portion permitted by the width to the second side portions selected to permit high frequency calls.

21. The game call of claim 1, wherein the Open Arch Frame is structured and arranged to permit the flexible diaphragm to generate sounds when the flexible diaphragm has been stretched beyond a point where, absent the Open Arch Frame, no sound would be produced.

22. The game call of claim 1, wherein the central air passage notch section provides a region within which the flexible diaphragm can vibrate despite the flexible diaphragm otherwise contacting the opposing leg sections.

23. The game call of claim 1, wherein the opposing leg sections are structured and arranged to limit the upward motion of the side portions of the diaphragm, the air passage notch section structured and arranged to provide an air passage above the central portion of the flexible diaphragm and permit upward motion of the central portion of the flexible diaphragm when the side portions of the flexible diaphragm are otherwise restrained by the leg sections.

24. The game call of claim 1, wherein the air passage notch provides consistent direction of air flow above the central portion of the flexible diaphragm thus permitting consistently reproducible sounds from the flexible diaphragm.

25. The game call of claim 1, wherein the flexible diaphragm is a latex diaphragm.

26. The game call of claim 1, wherein the flexible diaphragm is comprised of multiple layers of flexible material.

27. The game call of claim 26, wherein at least one layer is a partial layer, extending partway between the U-shaped frame.

28. The game call of claim 27, wherein the partial layer is evenly disposed across the longitudinal axis.

29. The game call of claim 27, wherein the partial layer is asymmetrically disposed across the longitudinal axis.

30. The game call of claim 1, wherein a flexible member is disposed around the exterior periphery of the frame.

31. A diaphragm game call comprising:
a U-shaped frame having a top side and a bottom side, an exterior periphery and an interior periphery, and a longitudinal axis;
a flexible diaphragm disposed in the U-shaped frame between the top side and the bottom side and across the interior periphery, the flexible diaphragm having side portions adjacent to the longitudinal axis and a central portion generally upon the longitudinal axis;
an Open Arch Frame spanning the interior periphery generally perpendicular to the longitudinal axis and generally normal to the top side and disposed above the flexible diaphragm, the arch frame having a central air passage notch section, and opposing leg sections rising towards each other below the air passage notch section, the opposing leg sections structured and arranged to limit the upward motion of the side portions of the diaphragm, the air passage notch section structured and arranged to provide an air passage above the central portion and permit upward motion of the central portion of the diaphragm when the side portions are otherwise restrained by the leg sections.

32. The game call of claim 31, wherein the Open Arch Frame is formed from a metal strip.

33. The game call of claim 31, wherein the Open Arch Frame is formed from rounded wire.

34. The game call of claim 31, wherein the central air passage notch section is a tone slot.

35. The game call of claim 31, wherein the underside of the air passage notch is selected from the group consisting of: grooved, ridged, and textured.

36. The game call of claim 31, wherein the profile of the air passage notch is selected from the group consisting of: an arch, a rectangle, and a portion of a circle.

37. The game call of claim 31, wherein position of the Open Arch Frame is user adjustable.

38. The game call of claim 31, wherein the Open Arch Frame is structured and arranged to position the call within a person's mouth in a consistent position.

39. The game call of claim 31, wherein the leg sections and the open air passage notch section permit varying lengths of the central portion of the leading edge of the diaphragm to be vibrate, the game call thereby permitting a range of different frequency calls.

40. The game call of claim 31, wherein for the Open Arch Frame, the opposing sections rising from the top of the U-shaped frame and curving towards each other with a first curvature, the air passage notch section transitioning to a second curvature different from the first curvature.

41. The game call of claim 31, wherein the Open Arch Frame is provided by the air passage notch section having side walls at opposing first angles, and the opposing leg sections having opposing second angles different from the first angles.

42. The game call of claim 31, wherein the partial restraint of the flexible diaphragm side sections and unrestrained motion of the central portion of the flexible diaphragm permits precise sound modulation.

43. The game call of claim 31, wherein the air passage notch section has a width spanning the longitudinal axis correlating to a first central portion of the flexible diaphragm permitted unrestrained upward motion, the leg sections correlating to second side portions of the flexible diaphragm that restrain upward motion, the ratio of the first central portion permitted by the width to the second side portions selected to permit low frequency calls.

44. The game call of claim 31, wherein the air passage notch section has a width spanning the longitudinal axis correlating to a first central portion of the flexible diaphragm permitted unrestrained upward motion, the leg sections correlating to second side portions of the flexible diaphragm that restrain upward motion, the ratio of the first central portion permitted by the width to the second side portions selected to permit high frequency calls.

45. The game call of claim 31, wherein the air passage notch provides consistent direction of air flow above the central portion of the flexible diaphragm thus permitting consistently reproducible sounds from the flexible diaphragm.

46. The game call of claim 31, wherein the flexible diaphragm is a latex diaphragm.

47. The game call of claim 31, wherein the flexible diaphragm is comprised of multiple layers of flexible material.

48. The game call of claim 47, wherein at least one layer is a partial layer, extending partway between the U-shaped frame.

49. The game call of claim 48, wherein the partial layer is evenly disposed across the longitudinal axis.

50. The game call of claim 48, wherein the partial layer is asymmetrically disposed across the longitudinal axis.

51. The game call of claim 31, wherein a U-shaped flexible member is disposed around the exterior periphery of the U-shaped frame.

52. A method for calling game with a diaphragm game call comprising:
- inserting a game call for producing calls of varying frequency in a human mouth, the game call including;
  - a U-shaped frame having a top side and a bottom side, an exterior periphery and an interior periphery, and a longitudinal axis;
  - a flexible diaphragm disposed in the U-shaped frame between the top side and the bottom side and across the interior periphery, the flexible diaphragm having side portions adjacent to the longitudinal axis and a central portion generally upon the longitudinal axis;
  - an Open Arch Frame spanning the interior periphery generally normal to the top side, the Open Arch Frame disposed above the flexible diaphragm and generally perpendicular to the longitudinal axis, the arch frame having a central air passage notch section, and opposing leg sections rising towards each other below the air passage notch section;
  - wherein the flexible diaphragm has a leading edge having side portions adjacent to the longitudinal axis and a central portion generally upon the longitudinal portion, the Open Arch Frame disposed across the interior periphery such that when the flexible diaphragm is made to vibrate, the side portions of the leading edge of the flexible diaphragm are in contact with the opposing leg sections;
- placing the game call near the front of the mouth, the Open Arch Frame assisting in angling the call within the mouth;
- pressing the game call against a roof of the mouth;
- causing air to flow past the diaphragm, the air causing the flexible diaphragm to move against the Open Arch Frame and vibrate within the central air passage notch section.

53. The method of claim 52, wherein pressing the game call against the roof of the mouth seals the top side to a roof of the mouth, the subsequent flow of air passing over only the bottom side.

54. The method of claim 52, wherein pressing the game call against a tongue seals the bottom side to the tongue, the subsequent flow of air passing over only the top side.

55. The method of claim 52, wherein pressing the game call against the roof of the mouth maintains the position of the call as the user causes air flow past the flexible diaphragm on both the top side and the bottom side.

56. The method of claim 52, wherein the air passage notch section has a width spanning the longitudinal axis correlating to a first central portion of the flexible diaphragm permitted unrestrained upward motion, the leg sections correlating to second side portions of the flexible diaphragm that restrain upward motion, the ratio of the first central portion permitted by the width to the second side portions selected to permit low frequency calls.

57. The method of claim 52, wherein the air passage notch section has a width spanning the longitudinal axis correlating to a first central portion of the flexible diaphragm permitted unrestrained upward motion, the leg sections correlating to second side portions of the flexible diaphragm that restrain upward motion, the ratio of the first central portion permitted by the width to the second side portions selected to permit high frequency calls.

58. The method of claim 52, wherein the air passage notch provides consistent direction of air flow above the central portion of the flexible diaphragm thus permitting consistently reproducible sounds from the flexible diaphragm.

* * * * *